Feb. 23, 1965 N. B. PETERSON 3,171,043
SIGNAL CUT-OFF ELECTRICAL SYSTEM
Filed Jan. 9, 1962 2 Sheets-Sheet 1
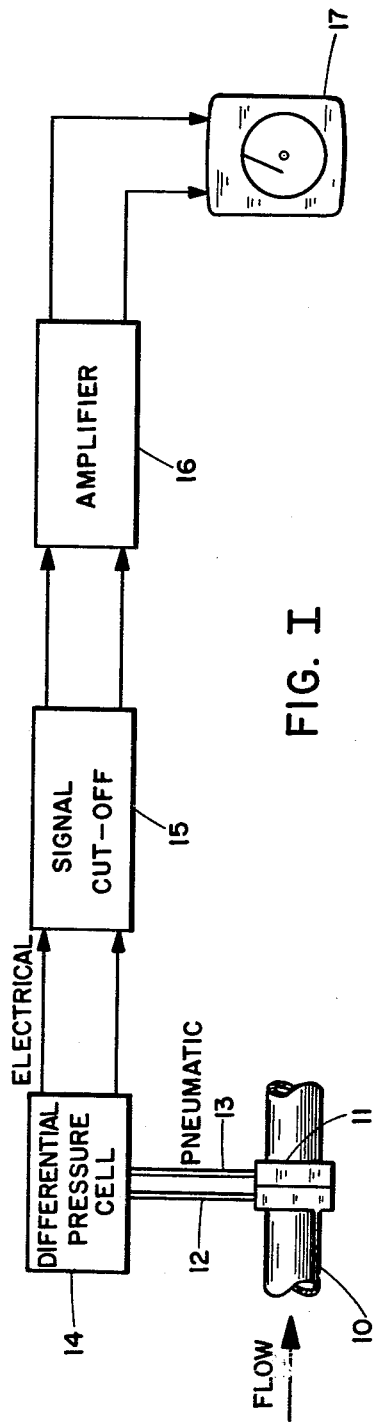
FIG. I
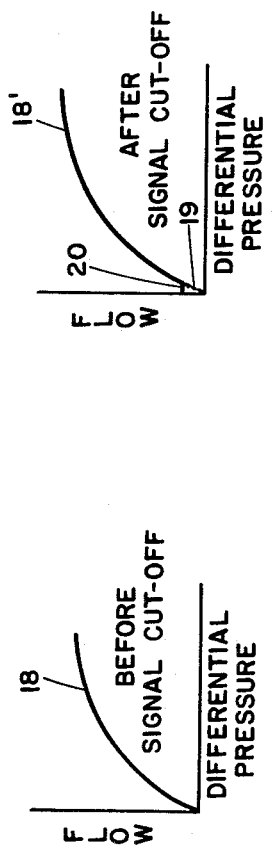
FIG. III
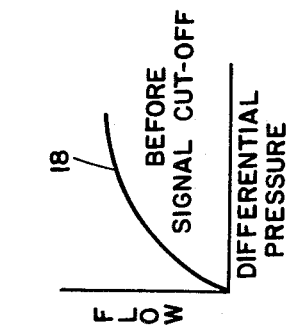
FIG. II
INVENTOR.
NEIL B. PETERSON
BY
Lawrence H. Patton
AGENT

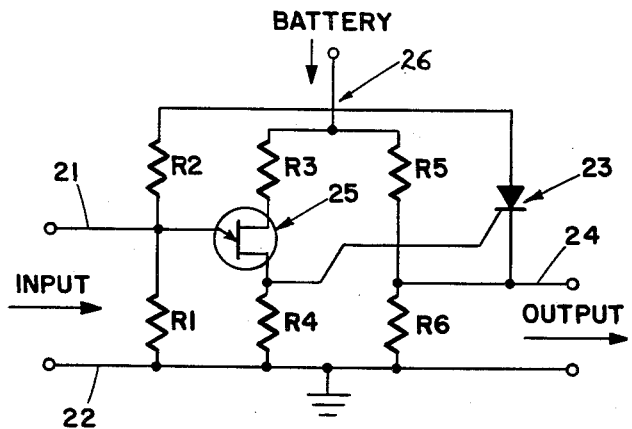
FIG. IV
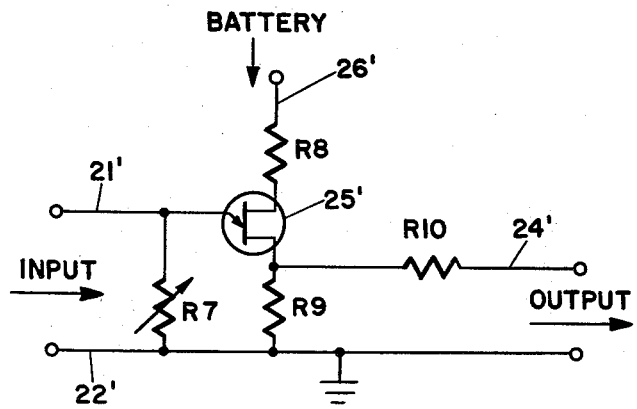
FIG. V

United States Patent Office 3,171,043
Patented Feb. 23, 1965

3,171,043
SIGNAL CUT-OFF ELECTRICAL SYSTEM
Neil B. Peterson, Raynham, Mass., assignor to The Foxboro Company, Foxboro, Mass., a corporation of Massachusetts
Filed Jan. 9, 1962, Ser. No. 165,148
1 Claim. (Cl. 307—88.5)

This invention relates to industrial instrumentation, and has particular reference to instrument systems which are mainly electrical wherein certain portions of signal span are undesirable.

A cut-off is provided for such undesirable portions. Further, a bias signal is provided to take the place of the cut-off signal.

This invention involves a solid state system. As an illustrative example, it utilizes semi-conductors in a flow measurement system wherein a direct current electrical signal is produced, and wherein this signal has a square root characteristic.

Such a system may result in a signal with a level below which the signal is erratic. This may be an initial, low value range. The output values are not dependably or repeatably representative of the input values, for example, from zero up to the order of 7% of output.

Other electrical signal forms, either linear or of different characterization, come within the scope of the treatment of this invention when signal values below a particular value are erratic to the extent of providing a similar problem.

Such erratic responses are very undesirable in that misleading or confusing actions may result therefrom.

It is preferable that these erratic signals be cut off, and that a predetermined signal situation such as a minimum, constant level bias be provided in their stead.

It is therefore an object of this invention to provide a new and useful signal cut-off electrical system.

Other objects and advantages of this invention will be in part apparent and in part pointed out hereinafter and in the accompanying drawings, wherein:

FIGURE I is a schematic illustration of a system according to this invention;

FIGURE II is an illustration of a square root curve form of a signal as it enters the low signal cut-off device of FIGURE I;

FIGURE III is an illustration of the curve form of a signal as it leaves the low signal cut-off device of FIGURE I, with the low level range cut off and the output bias applied;

FIGURE IV is an illustration of one circuit form suitable for the low signal cut-off unit of FIGURE I and according to this invention; and FIGURE V is an illustration of another circuit form, also suitable for the low signal cut-off unit of FIGURE I and according to this invention.

The illustrative system of FIGURE I sets forth an application of this invention through the measurement of flow.

This system involves flow measurement on a differential pressure basis. The differential pressure values are converted to electrical values and passed through signal cut-off means and amplifier means, to operate a device such as a recorder.

The system of FIGURE I, more specifically, is set up as follows: In a fluid flow pipe 10 there is established a flow sensing orifice plate unit 11. Upstream of the orifice plate unit 11, there are pressure taps 12 and 13, through which the pressure on each side of the orifice plate is sensed.

The pressure taps 12 and 13 are led to a differential pressure cell 14. The orifice plate pressure differential is established through the cell 14 and made available as an output thereof in the form of an electrical signal.

This signal varies with flow through the pipe 10, and by the nature of the system, there is a square root factor in the differential pressure as related to the flow through the orifice plate unit 11. Thus there is a square root factor in the electrical output of the differential pressure cell and throughout the rest of the system, always as related to the flow through the orifice plate unit 11.

The system of FIGURE I is illustrative of this invention without any square root conversion. Linearizing or otherwise changing the square root factor, may be accomplished as desired by the use of conventional devices.

The electrical signal output of the differential pressure cell 14 is fed to signal cut-off means 15. Details of such cut-off means are set forth in FIGURES IV and V and described hereinafter. The output of the cut-off means 15 is fed to an amplifier 16, whose output is, in turn, fed to a conventional recorder 17.

The recorder 17 thus provides a representative record of flow through the pipe 10 and the orifice plate unit 11.

The effect of the signal cut-off means 15 is illustrated in "before" and "after" form, respectively by the curve showings of FIGURES II and III.

FIGURE II shows a square root curve 18 representing the relation between flow change in the pipe 10 and the differential pressure in terms of the electrical output of the D/P cell 14, prior to the action of the signal cut-off means 15.

FIGURE III shows mainly the same square root curve 18' as in FIGURE II. It, however, represents the relation between flow change in the pipe 10 and the differential pressure in terms of the electrical output of the signal cut-off means 15.

FIGURE III shows the cut-off portion 19 of the square root curve as a dotted line. In addition, FIGURE III shows a solid, horizontal, above zero line 20, which represents a bias applied as a part of the signal cut-off means 15 to maintain a minimum output signal while the flow is operating in the area between zero and that level at which the signal is cut off. This level may be, for example, 7% of the output of the D/P cell 14. It has been found that this span is erratic in a system of this type.

The cut-off and bias functions of this invention are illustrated in the circuits of FIGURES IV and V, which are alternate forms of the signal cut-off means 15 of FIGURE I.

Since the low signal is erratic and not repeatably representative of the flow changes in that area, if it is representative at all, it is desirable that this signal area be cut off. But the cut-off would ordinarily bring the signal to zero and there could be undesirable record painting or erratic recording in this area. Therefore, a bias is provided to establish a constant, above zero minimum signal when the flow is so little as to tend to produce an output signal below the cut-off point.

This bias is illustrated by the horizontal line 20 in FIGURE III.

The solid-state electrical circuitry set forth as examples of how to cut off and bias the signal of the system of FIGURE I, is set forth in the FIGURES IV and V.

FIGURE IV shows a combination cut-off and bias circuit with an input lead 21 and a ground lead 22 represented by the two input leads to the FIGURE I signal cut-off means 15.

The FIGURE IV signal circuit is, by the drawing, in through lead 21, up through a current limiting resistor $R_2$, across to a silicon, controlled rectifier 23, and to the above-ground output lead 24. This is the ordinary path of the signal, but below the cut-off level the rectifier 23 blocks the signal because there is no conductive action therein in that signal area.

The FIGURE IV input lead 21 also is in the emitter circuit of a unijunction transistor 25 which will not fire until an input level growing from zero, reaches a level established by an input bias resistor $R_1$ which is connected from the input lead 21 to the ground lead 22. When the input signal rises to the predetermined cut-off level, the unijunction transistor 25 is fired, allowing triggering current to flow therethrough to the rectifier 23 as will be seen hereinafter.

Again in FIGURE IV, the output minimum bias represented by the FIGURE III horizontal line 20, is applied from a separate, battery source 26. From this source, a constant minimum level output signal is applied to the output lead 24 through a resistance divider network comprising series connected resistors $R_5$ and $R_6$, with the output lead 24 connected between these resistors as well as to the rectifier 23. This output level is maintained during signal cut-off, and is additive with the amount of signal over and above the established minimum.

Another portion of the battery circuit is through a temperature effect minimizer resistor $R_3$, through the unijunction transistor 25, and through a resistor $R_4$ as a transistor bias, to ground at the ground lead 22.

Accordingly, when the transistor 25 is fired, the transistor passes current from the battery to the rectifier 23 through resistor $R_3$, and the rectifier 23 is triggered to pass the signal over and above the cut-off level.

The FIGURE V circuit is a simplified version of the FIGURE IV showing, which is useful in many applications. The function of this FIGURE V circuit is the same generally as that of FIGURE IV. The output bias is derived from the battery 26' and is applied to the output lead 24' by leakage through the transistor 25'. In this case, the signal above cut-off is fed through the transistor 25' to the output lead 24' after the transistor 25' has been fired by a sufficient level of input signal.

In FIGURE V, resistor $R_7$ is equivalent in function with resistor $R_1$ of FIGURE IV except that $R_7$ is more useful, in that it provides an adjustment of the signal cut-off level.

$R_8$ of FIGURE V is equivalent to $R_3$ of FIGURE IV in that the basic function of both is to minimize temperature effects.

$R_9$ and $R_{10}$ comprise a divider network to establish suitable output for the expected load. $R_9$ is a zero resistor in the sense of affecting the bias level from the battery source and $R_{10}$ is a span resistor.

This invention, therefore, provides a new and useful signal control system involving signal cut-off and biasing functions.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

An electrical measurement cut-off filter comprising:

an output terminal and a reference terminal, a uni-junction transistor having an input control electrode and a first and second base electrode, said input control electrode being connected to an electrical measurement signal source and having its impedance between said first and second base electrodes become minimal with a maximum current therethrough when the signal from said electrical measurement signal source is above a predetermined threshold level, bias means including a D.C. source for said uni-junction transistor including a resistance means in series with said first and second base electrodes, an SCR having an anode and a cathode and a gate electrode and having said gate electrode responsive to an input firing potential determined by the current through said resistance means and having said anode and said cathode connected between said electrical measurement signal source and said output terminal, and a voltage divider supplied by said D.C. source having a tap connected to said output terminal, whereby input measurement signals below the level sufficient to switch on said uni-junction transistor thereby leave said SCR disabled allowing only the potential from said tap of said voltage divider to appear at said output terminal while said signals above said level switch on said uni-junction transistor in turn firing said SCR.

References Cited by the Examiner

UNITED STATES PATENTS

| | | | |
|---|---|---|---|
| 1,560,951 | 11/25 | Thompson et al. | 73—205 |
| 2,233,339 | 2/41 | Brown | 325—414 |
| 2,669,874 | 2/54 | Ziegler | 73—206 |
| 2,672,504 | 3/54 | Grimes | 325—473 X |
| 2,954,692 | 10/60 | Hornfeck | 73—205 |
| 3,040,575 | 6/62 | Sable | 73—211 |

OTHER REFERENCES

Silicon Controlled Rectifier Manual, General Electric, 1961, pages 62, 63, 79, and 80.

Pages 23 and 24, General Electric Notes on Application of Silicon Unijunction Transistors, May 1961.

ARTHUR GAUSS, *Primary Examiner*.

ROBERT EVANS, *Examiner*.